UNITED STATES PATENT OFFICE 2,169,812

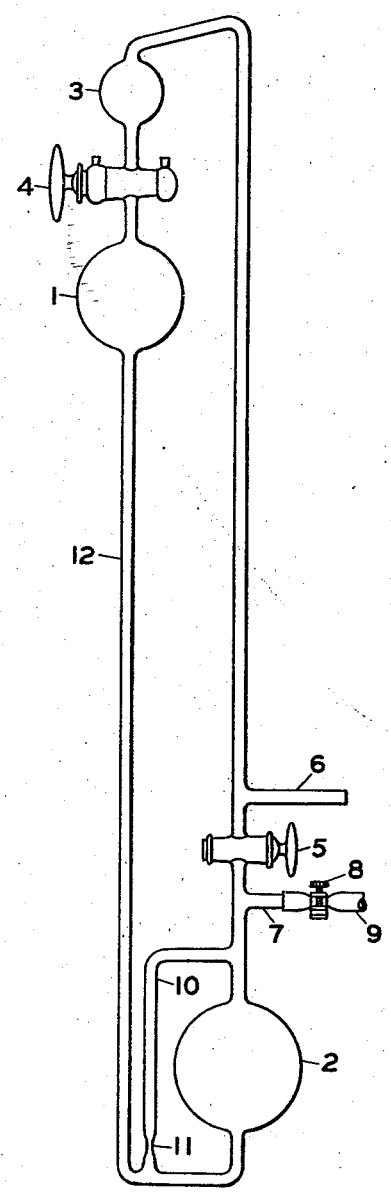

GAUGE FOR MEASUREMENT OF GAS PRESSURE

Samuel Palkin and Thomas C. Chadwick, Washington, D. C.; dedicated to the free use of the People of the United States of America Application April 22, 1938, Serial No. 203,626

5 Claims. (Cl. 73—31)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

We hereby dedicate the invention herein described to the free use of the people of the United States of America to take effect on the granting of a patent to us.

This invention relates to a novel type vacuum gauge for indicating pressure and changes in pressure of a gas at less than atmospheric pressure, utilizing preferably a light oil as the manometric fluid. The gauge can, however, also be used with mercury as the manometric fluid, and offers certain advantages over the ordinary U-type mercury gauge.

The present invention, in its use as an oil gauge, is a simplified form of an oil gauge previously described in United States Patent No. 2,051,740, making possible the utilization of light oil for the manometric fluid, without resort to the more elaborate device there described for the production of the Torricellian vacuum.

The object of this invention is to provide a convenient and simple means for measuring such pressure and pressure changes with high precision and accuracy, and to permit observation of such pressure changes continuously without intermittent manipulation for each observation, as is the case with some gauges.

Ordinary mercury manometers, known as the U-tube or U-type No. 16, permit a wide range of pressure measurements, but are comparatively coarse and insensitive. Pressure changes less than ½ mm. cannot be read with any degree of accuracy. This is true also of the barometric type. These manometers, because of their simplicity of construction, the ease with which direct readings of pressure can be made, are probably the most widely used. Unlike the U-type, however, the barometric type is affected by variation in atmospheric pressure and is thus unsuited for the reading of "absolute" pressures, correction for atmospheric change having to be made with each reading.

As is well known, the actual reading of the U-type is made possible by departure of the mercury from the closed end when vacuum is applied to the open end, that is, when the open end of the manometer is in communication with the gas system whose pressure is to be measured, and such pressure readings are indicated by the difference in height of the columns of mercury in the two legs of the U.

It is also obvious that if it were practicable to use lighter liquids in the ordinary U-type manometer it would be possible to read smaller pressure differences than can be read on the mercury manometer, the degree of increased precision depending upon the relative specific gravities of the mercury and the lighter liquid used. However, unlike the heavy liquid mercury, the lighter liquids, as is well known, can not be dislodged from the closed end of an ordinary U-type manometer, regardless of how low the pressure is made at the other end.

Heretofore the difficulty due to the impossibility of its dislodgment has been overcome by substituting for the closed end of the ordinary U, an open end in communication with a high-vacuum condensation pump (such as in the Hickman gauge, J. Amer. Chem. Soc., December, 1930, p. 4728). In that gauge there is substituted for the Torricellian vacuum of the closed end of the ordinary mercury U-type, a vacuous space maintained by operation of the condensation pump, the latter being an integral part of the gauge.

Unlike the gauge described in United States Patent No. 2,051,740, which requires in its construction an extra U tube in which mercury is required as a backing medium and to provide a means for rendering possible free movement of the oil column by establishment of a Torricellian vacuum between the mercury and oil, the present gauge is in effect a simple U-tube type in which oil or mercury is used as the manometric fluid and the closure of the reference (Torricellian vacuum end) is accomplished by a special stopcock grease- or mercury-sealed.

We have found, moreover, that while dislodgment of light liquid such as oil from the closed end of the ordinary U-tube type manometer, is not possible, such dislodgment in the gauge as described is easily accomplished by the physical effect of slight rotation of the plug within the stopcock barrel.

The following description considered together with the accompanying drawing will show the construction of a gauge of this type, the manner of preparation or conditioning, and the application. However, it is to be understood that this invention is not restricted to this exact form of gauge nor to the specific manometric liquid used in the illustration.

We attain the objects outlined above by the device illustrated in the accompanying diagram.

Referring with more particularity to the drawing, reservoirs 1, 2 and 3 are joined hermetically, as indicated, by tubes approximately 10 mm outside diameter (7 mm. inside bore). Reservoir 1, generally speaking, serves as the Torricellian vacuum chamber; reservoir 2 as an oil reservoir and as a degassing chamber for conditioning the gauge as described later, and the small reservoir 3 as an overflow chamber and to provide a seal (manometric liquid) above the locking stopcock 4.

Stopcocks 4 and 5 directly above reservoirs 1 and 2, respectively, serve to lock the manometric liquid just prior to use of the gauge for pressure measurement, and both of said stopcocks serve to provide communication with the pumping system by way of tube 6, and together with tube 7, which provides communication with the atmosphere, by way of a clamped rubber tube 9, when necessary for manipulating the movement of the liquid during preparation of the gauge for use, as described hereinafter. The relative position of reservoirs 1 and 2, their relative dimensions, etc., should be more or less as indicated in the drawing, and it is desirable that reservoir 1 should be as close to stopcock 4 as practicable, and reservoir 2 as low down as possible, in order to provide a maximum reading range for a gauge of any given height. The total height between the bottoms of reservoirs 2 and 3 may be any convenient distance when oil is used as the manometric liquid, but should not exceed 75 cms. if mercury is to be used as the manometric liquid, in order to permit free movement of the mercury to a point above stopcock 4 when desired. With oil as the manometric liquid, the greater the oil reading range desired, the higher must be the stopcock 4 and the longer the tubes, etc., set-up.

In order to maintain a Torricellian reference vacuum, the oil or other light liquid used must have a very low vapor pressure and be free from volatile impurities to insure against the filling of reservoir 1 with vapors. These properties, as it is well recognized, are necessary for liquids used in manometric work.

In preparing the gauge for use, the requisite quantity of purified oil, ester, or other non-volatile liquid is introduced through tube 7 before attachment of the rubber tube 9 and clamp 8 with the aid of a pumping system attached to 6, and manipulation of stopcocks 4 and 5, sufficient to fill reservoir 1, substantially half of reservoir 3 and leaving approximately a cm. height of oil in reservoir 2. When the gauge has been thus filled, the clamper rubber tube 9 is now attached to tube 7 and the clamp locked. The oil is then allowed to drop back by opening stopcock 4. With the pump operating continuously, the oil, which now fills about ⅔ of reservoir 2, is degassed first by continuous pumping for an hour or so, and then in addition to this, by gently heating reservoir 2, with the pump still operating. When the oil has been thoroughly degassed, it is cooled, stopcock 5 is locked, and a very small opening to the atmosphere is provided by slightly unscrewing clamp 8. The oil is then allowed to rise slowly into reservoir 1, stopcock 4 being opened, with the pump operating until the stage of the oil is within a few cm. of the top of reservoir 1. Then stopcock 4 is temporarily closed; then opened very gradually, permitting the oil to rise slowly through stopcock 4, and about half way into reservoir 3, when stopcock 4 is locked and screw clamp 8 securely tightened.

Stopcock 5 is now opened to the pumping system, and by rotating very slightly the plug 4, the oil is dislodged and it falls to a level in tube 12 corresponding to the pressure applied. The difference in the levels of the liquids in tubes 12 and 10 is a function of the pressure. The tube 10 may be provided with a reduced cross section 11 to temper undue sudden movement of the oil through the tube.

The vacuum chamber 1 is employed to minimize errors resulting from small amounts of gas which might enter the instrument and find its way into the vacuum space. This chamber has the effect of expanding the gas to such a relatively large volume and corresponding low pressure that the effect upon the level of the manometric liquid is negligible in the case of small amounts of gas.

Having thus described our invention, we claim:

1. A vacuum gauge comprising a continuous tubular circuit with two vertical arms, a vacuum chamber disposed near the top of one of said arms, a reservoir disposed on the other arm, stopcocks above said chamber and reservoir, a degassed manometric liquid partly filling said reservoir and the arm of the tube below said chamber, there being normally a Toricellian vacuum in said chamber and in the non-filled portion of said tube below the chamber, and outlet means for communicating the space above the liquid in said reservoir with a pressure system.

2. A vacuum gauge comprising a U-tube manometer, a reservoir disposed above one arm of the tube and a vacuum chamber disposed above the other arm, a column of degassed non-volatile liquid of low specific gravity partly filling the reservoir and the arm of the tube below the vacuum chamber, there being normally a Torricellian vacuum in said chamber and in the tube therebelow down to the level of the manometric liquid, outlet means for communicating the reservoir with a pressure system, and a tubular by-pass across said reservoir, said by-pass having a vertical segment in proximity to the arm of the tube opposite the reservoir.

3. A vacuum gauge as described in claim 1 having a gauge in proximity to the arm of the tube opposite the reservoir for indicating the level of the liquid in said reservoir.

4. A vacuum gauge comprising a U-tube manometer, a reservoir disposed above one arm of the tube and a vacuum chamber disposed above the other arm, a column of degassed non-volatile liquid of low specific gravity partly filling the reservoir and the arm of the tube below the vacuum chamber, there being normally a Torricellian vacuum in said chamber and in the tube therebelow down to the level of the manometric liquid, outlet means for communicating the reservoir with a pressure system, a valved vent disposed above the reservoir, a stopcock above said vent, a stopcock above said vacuum chamber, an overflow reservoir above said last-mentioned stopcock, and tubular means connecting said overflow reservoir and said first-mentioned stopcock.

5. A vacuum gauge in combination with means for degassing its manometric liquid and creating a Torricellian vacuum, comprising a closed U-tube manometer, a reservoir for holding the manometer liquid and degassing it disposed in the lower part of one of the arms of said U-tube, a vacuum chamber near the top of the other arm, a stopcock above said chamber, an overflow reservoir above said stopcock, a valved vent above said first-mentioned reservoir, a stopcock above said valved vent, and outlet means above said last-mentioned stopcock.

SAMUEL PALKIN.
THOMAS C. CHADWICK.